Oct. 29, 1940.  F. W. HAVERSACK  2,219,742
PIPE-FORMING MACHINE
Filed June 17, 1938   4 Sheets-Sheet 1
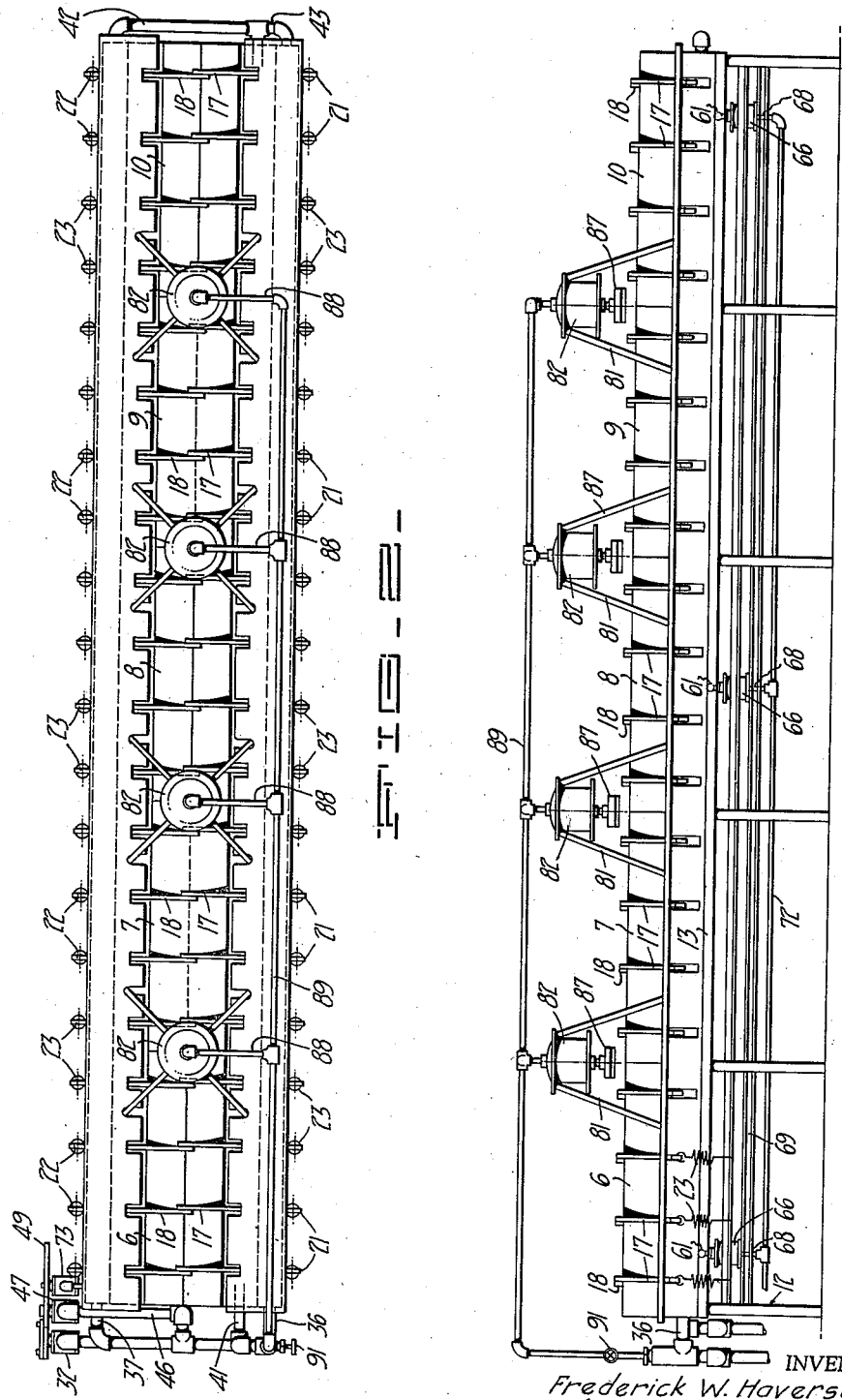
INVENTOR.
Frederick W. Haversack.
BY
ATTORNEY.

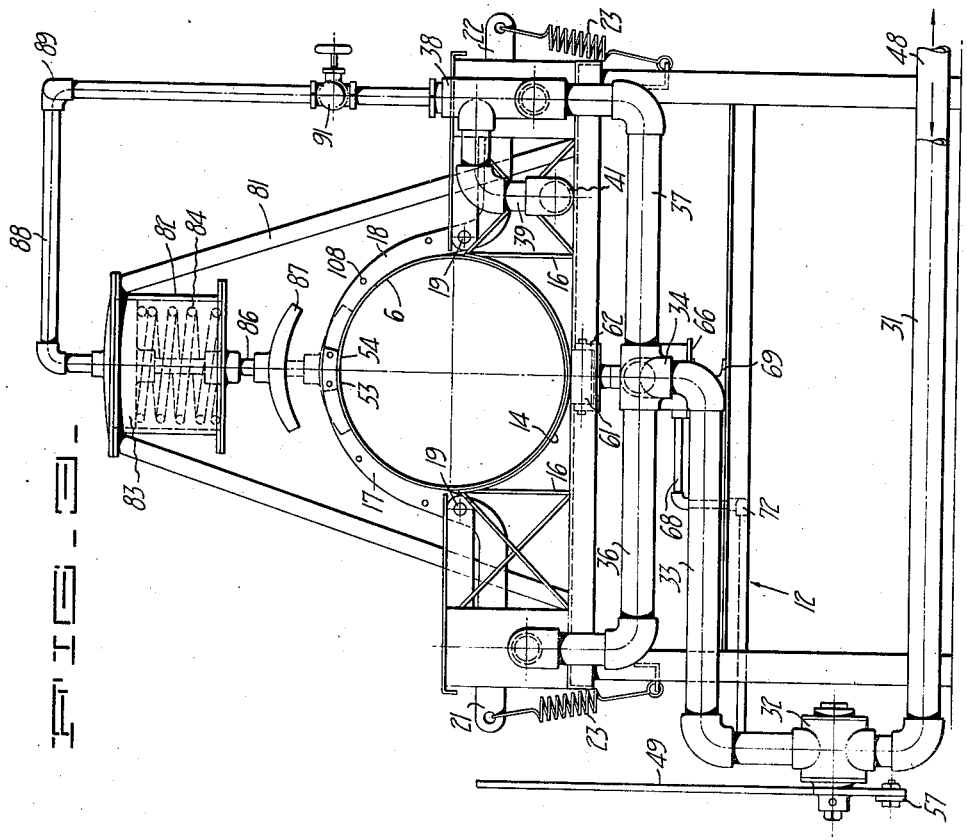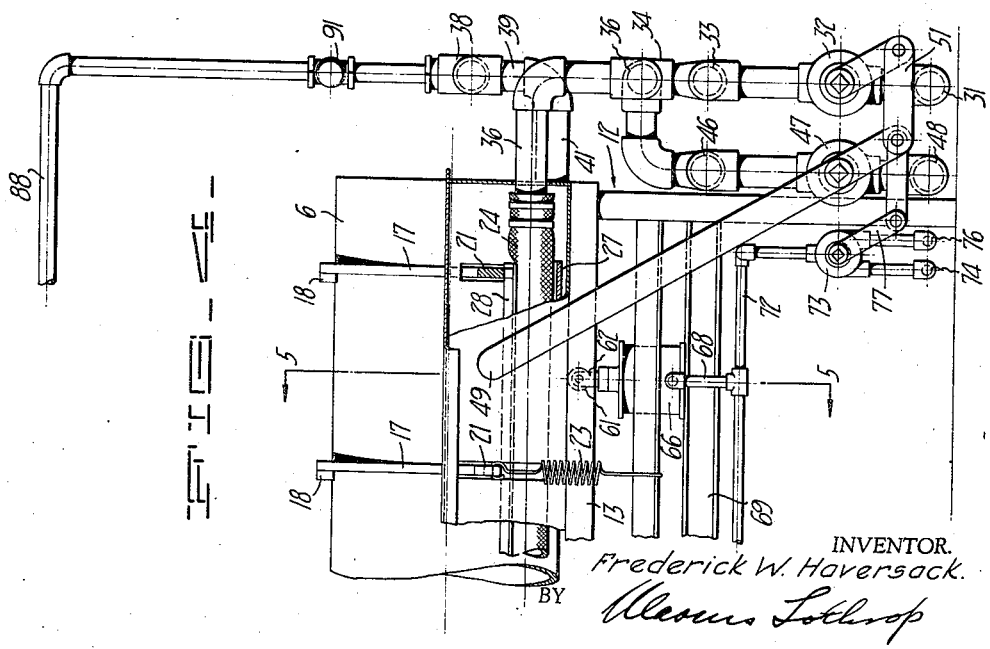

INVENTOR.
Frederick W. Haversack
BY
ATTORNEY.

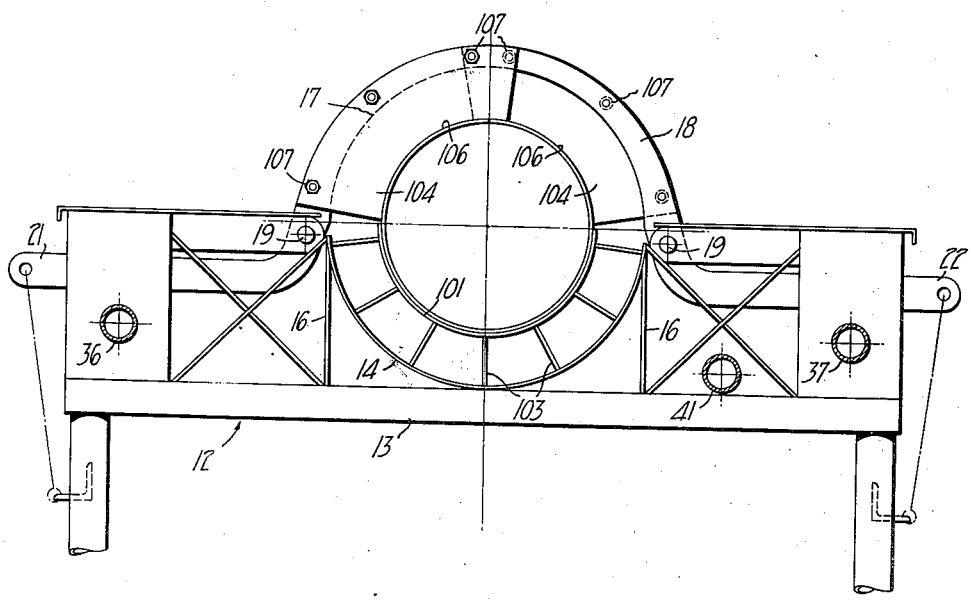
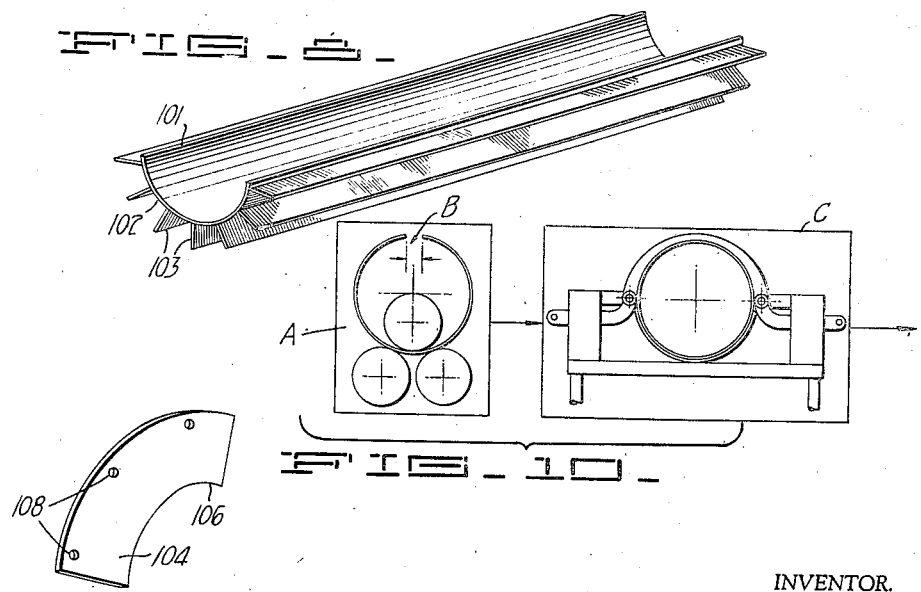

Patented Oct. 29, 1940

2,219,742

UNITED STATES PATENT OFFICE 2,219,742

PIPE-FORMING MACHINE

Frederick W. Haversack, Sacramento, Calif., assignor of one-half to Sacramento Pipe Works, Sacramento, Calif., a corporation of California Application June 17, 1938, Serial No. 214,232

6 Claims. (Cl. 113—102)

My invention relates to mechanisms for use in connection with the fabrication and welding of sheet material into circular-cylindrical pipe sections, a plurality of which are secured together to form a pipe, and is especially concerned with improvements upon and variations from the pipe-forming machine shown in my copending application entitled "Pipe-forming machine," filed November 8, 1937, with Serial No. 173,424, and also relates to a method of handling sheet material to suit it for pipe formation.

It is an object of my invention in general to improve pipe-forming machines.

Another object of my invention is to provide a pipe-forming machine in which an entire pipe length can be fabricated.

Another object of my invention is to provide a pipe-forming machine in which the pipe sections are formed very closely to exact size.

Another object of my invention is to provide a pipe-forming machine in which large lengths of pipe can readily be handled with little labor.

Another object of my invention is to provide a pipe-forming machine in which pipe sections of different sizes can readily be fabricated.

An additional object of my invention is to provide means for ensuring accurate meeting of pipe section edges which are to be welded.

A further object of my invention is to provide a pipe-forming machine of large capacity, in which the various parts operate in correct synchronism.

Another object of my invention is to simplify and improve the preliminary handling of sheet material by the use of my forming machine so that cheaper, more accurate pipe can be produced.

The foregoing and other objects are attained in the embodiment of the invention illustrated in the drawings, in which—

Fig. 1 is a side elevation of a pipe-forming machine constructed in accordance with my invention;

Fig. 2 is a plan of the machine shown in Fig. 1;

Fig. 3 is an end elevation of my pipe-forming machine;

Fig. 4 is a fragmentary side elevation of the machine shown in Fig. 3;

Fig. 7 is a cross-section somewhat like Fig. 6 but showing the machine forming a smaller sized pipe;

Fig. 8 is a perspective of a small-sized cradle;

Fig. 9 is a perspective of a shoe to be attached to a clamping arm; and

Fig. 10 is a diagram illustrating the practice of the method of my invention to reduce the complexity of the preliminary sheet handling.

Figure 5:
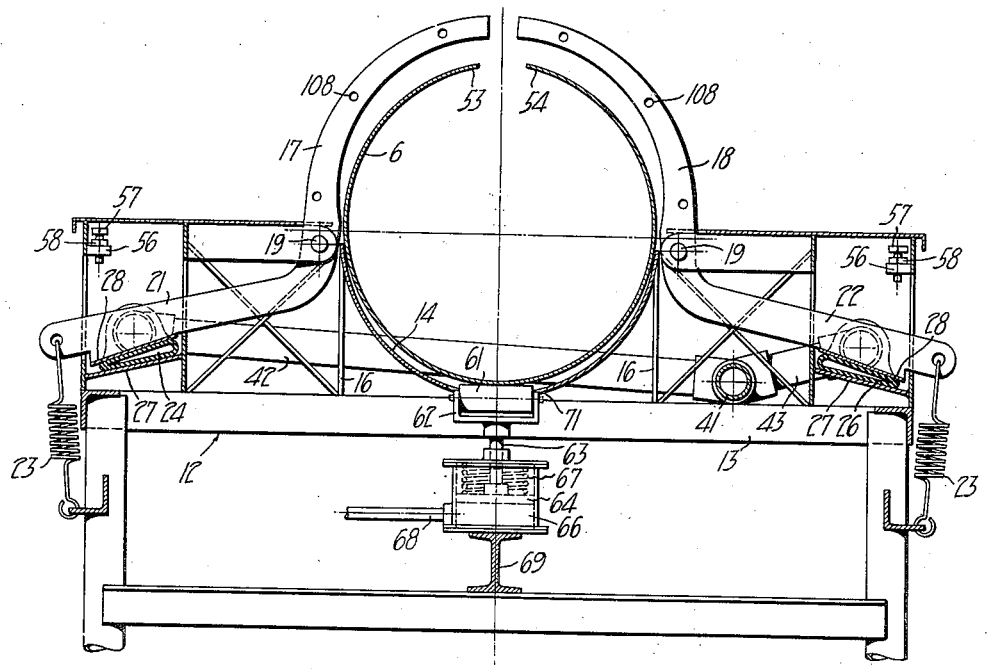
Fig. 5 is a cross-section the plane of which is indicated by the line 5—5 of Fig. 4.
Figure 6:
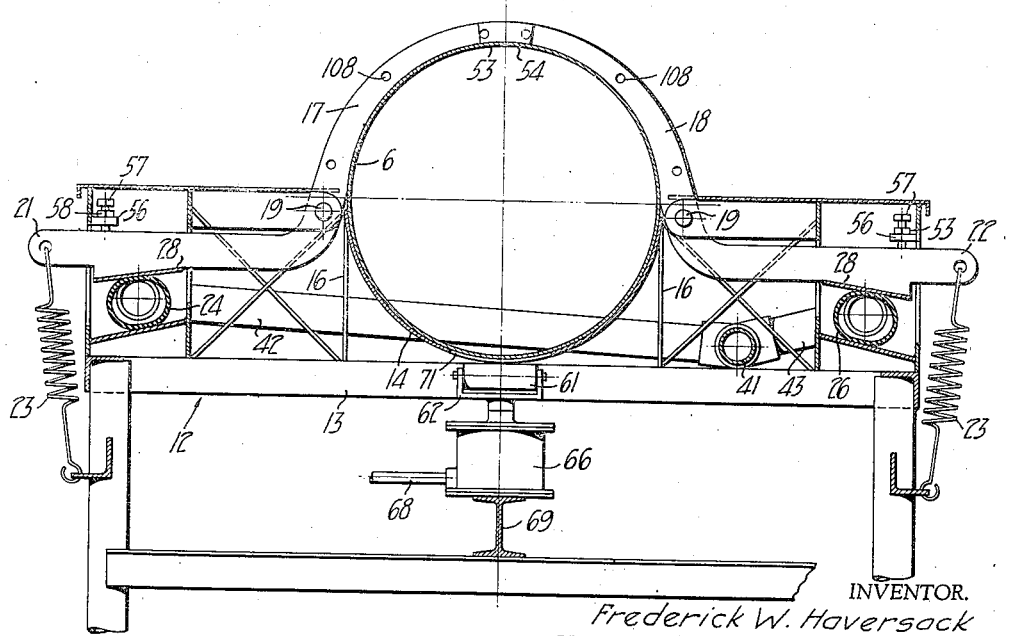
Fig. 6 is a cross-section comparable to Fig. 5 but showing the mechanism in a different position.

In its preferred form, the pipe-forming machine of my invention includes a frame on which is situated a cradle conforming substantially with about half the contour of a pipe to be formed, with which co-operate a pair of arms together completing the contour of the pipe to be formed and pivoted on the frame substantially at the diameter of the cradle, for simultaneous clamping action to hold a pipe in correct contour upon the cradle, and the method includes preliminarily forming the sheet in pyramid rolls to less than the usual extent and completing the formation of the sheet by the clamping action of my forming machine.

While the pipe-forming machine of my invention can include a variety of different forms and can be altered in many details to correspond with the particular environment in which it is to be utilized, it has successfully been embodied in the form disclosed in the drawings. In this form the machine is used in fabricating a pipe length which includes a plurality of pipe sections 6, 7, 8, 9 and 10, each of which is comparable to the other sections and includes a planar sheet or plate which has been preliminarily rolled.

Heretofore it has been usual to form a planar sheet by passage through pyramid rolls and to continue such forming until the sheet edges abutted and the sheet became a circular cylinder. Due to inaccuracies and variations in successive sheets, this necessitated skilled handling of the pyramid rolls and individual attention to the formation of each sheet. Even then, some tack welding was necessary while the cylindrical sheet was still in the pyramid rolls to hold to shape against distortion when released. This required alternation of forming and welding crews and made the preliminary form cost comparatively high.

In accordance with the method of my invention, this preliminary forming cost is cut to a fraction of its former amount. Sheet material which is initially formed in the pyramid rolls A (Fig. 10) is shaped much less than heretofore and is rolled only enough to bring it approximately into a cylindrical shape and not enough to cause abutment of the sheet edges. In fact, the sheet edges are purposely left with a space or clearance B therebetween. This is more than a minute slit and is of the order of one-tenth of the pipe diameter, and often varies in amount lengthwise of the tube. More important, the amount of clearance B varies considerably with successive sheets, since a standard setting of the pyramid rolls suffices for a given or nominal pipe size, and variations in successive sheets manifest themselves as variations in clearance. When the section has been so preliminarily formed it is removed from the pyramid rolls, without any tack welding, and is finally formed in the cradle and clamp arms of my forming machine C (Fig. 10). By following this method, no welding crew is necessary at the pyramid rolls, and the roll crew is reduced by several operators since there is no individual working of each sheet and no individual adjustment to make.

After each sheet has been forced into a circular-cylindrical form, the adjacent edges of the formed sheet are welded together and the circular meeting edges of successive sections are likewise welded together to form a continuous pipe length which itself is a substantially accurate circular cylinder including a plurality of pipe sections. Each pipe length is limited by external considerations, such as facility in shipping and handling, and any number of sections can be utilized to form one length, the five sections disclosed herein being chosen simply as a satisfactory example. The machine is constructed to handle whatever number of sections is most convenient.

In the present instance, therefore, I provide a frame 12 fabricated of suitable structural shapes to provide a bed 13 on which a longitudinal cradle 14 is supported. The cradle itself is preferably a heavy sheet corresponding to part of the contour of the pipe to be formed. In the present instance, the cradle is substantially a semi-circle in cross-section and is secured to the bed 13 and is held in position by braces 16.

In previous pipe-forming machines I have found that sometimes the prerolled sheets have a slight helical form so that their end edges are helical or spiral rather than planar, and it has sometimes been found necessary to provide means for axially displacing the meeting edges of the tubes in order to bring the ends into exact alignment. I have found, however, that by providing a semi-circular cradle, and by forcing a sheet which is only partially preformed tightly into the cradle, the partly formed sheet takes on a true cylindrical contour so that the longitudinal edges truly abut for welding and so that the end edges lie in parallel planes and any initial helical distortion is removed. By this means, therefore, successive sections are placed in correct abutment for welding, and the finished product is truly cylindrical throughout its entire length.

It is very desirable, however, that the pipe section be very closely confined within the cradle, and to that end I mount on the frame 12 a plurality of pairs of arms 17 and 18, each of which is supported on a pivot 19 preferably disposed substantially upon the diameter of the cradle 14 and as close thereto as is feasible. The contour of the arms 17 and 18 is preferably approximately a quadrant and is arcuate with the same curvature as the curvature of the cradle 14, so that when the arms are pivoted into a slightly overlapped position they continue the contour of the cradle and, together with the cradle, define a true circle.

Each of the arms 17 is integral with a lever 21, and each of the arms 18 is integral with a comparable lever 22, so that on opposite sides of the frame 12 there are two series or groups of levers 21 and 22. Each of the levers is preferably under the urgency of an associated spring 23, suitably secured to the frame 12, so that the arms 17 and 18 are ordinarily urged away from the cradle 14.

In order to urge the arms 17 and 18 toward the cradle 14 to clamp a pipe therein into proper forming position and in order simultaneously to actuate the two series of levers 21 and 22 respectively, I preferably provide hydraulic means including a pair of deformable and elongated hoses 24 and 26. Each of these rests upon an associated plate 27 included in the framework 12 and bears against a pad 28 on the lower face of the adjacent arm 21 or 22.

Since the hoses 24 and 26 have a great length, and since it is desirable that all of the arms 17 and 18 operate substantially simultaneously, I preferably provide means for introducing hydraulic fluid under pressure to both ends of the hoses so that the pressure is substantially equalized therein instantaneously. For this reason I connect a hydraulic fluid supply pipe 31 through a valve 32 which controls the flow, to a pipe 33 and into a union 34, from which branches 36 and 37 extend to the near or adjacent ends of the hoses 24 and 26 respectively. From the branch 37 a connector 38 leads to a stand-pipe 39 which is above the level of the hoses 24 and 26 and is connected by a longitudinal pipe 41 with rear branches 42 and 43 joined respectively with the far ends of the hoses 24 and 26. Thus, when the valve 32 is opened, hydraulic fluid under pressure flows immediately to both ends of the hoses so that they are promptly expanded simultaneously and substantially uniformly throughout their entire length, thereby actuating the levers 21 and 22 and urging the arms 17 and 18 into contact with a pipe on the cradle 14.

In order that the pressure may likewise be relieved promptly and substantially uniformly throughout the length of the two hoses, I provide at the union 34 a connecting pipe 46 which extends through a valve 47 to a discharge pipe 48. A hand-operated lever 49 actuates the valve 47 and, by a link connection 51, simultaneously actuates the valve 32. The valves 32 and 47 are so related that they operate simultaneously but with opposite effect, so that when the lever 49 is moved it interrupts the supply of hydraulic fluid through the valve 32 and opens the valve 47 to relieve hydraulic pressure by outflow through the pipe 46 and the valve 47 into the discharge pipe 48. Since the stand-pipe 39 is slightly higher than the hoses 24 and 26, the outflow of fluid is sufficient only to relieve the extra pressure and is not sufficient to drain the hoses. Then, when the next actuation is effectuated by manipulation of the lever 49, it is necessary only for there to be sufficient inflow to increase the pressure without refilling all of the piping and hoses.

In utilizing the mechanism, a partially formed and substantially cylindrical rolled sheet, with its longitudinal edges having clearance therebetween, is placed in the initial end of the cradle 14, and the lever 49 is actuated to bring the arms 17 and 18 into overlapping relationship so that the forming of the sheet is accurately completed as the edges 53 and 54 of the sheet are brought into proper welding abutment. Where the sheet is of substantial thickness there is no difficulty in relying upon the mutual abutment of the edges of the sheet to act as a positive stop for further compressing movement of the arms 17 and 18; however, where the sheet is relatively thin it sometimes occurs that while the edges of the sheet are brought into approximate abutment their thinness prevents them from staying in such position and they overlap each other progressively as the arms 17 and 18 continue to press the tube towards the cradle 14.

To prevent such overlapping, which is ordinarily disadvantageous, I preferably provide means for stopping the approaching movement of the arms 17 and 18 positively at any selected or adjusted location. This is effected simply by providing a plurality of lugs 56 on the framework at appropriate locations to receive set-screws 57 and lock nuts 58 each of which can bear upon an associated lever 21 or 22. The set-screws are amply strong to resist the hydraulic thrust of the actuating hoses 24 and 26, and the machine is preferably initially set for a pipe size to be manufactured by first installing an accurately machined or accurately sized piece of heavy casing on the cradle 14 and clamping the arms 17 and 18 thereupon without restraint. In this fashion all of the arms 21 and 22 are quickly positioned in their correct location for the nominal pipe-size, and the set-screws 57 and the lock nuts 58 are then manipulated into abutment with the levers 21 and 22. After the heavy casing has been removed, subsequent actuations of the hydraulic mechanism always restore the arms 17 and 18 to their correct adjusted position, and hence subsequent sections being clamped are brought exactly into their proper relationship without any overlap but with exceedingly close adherence to the nominal size.

Since the cradle 14 is of considerable superficial extent, and since the pipe fabricated therein is a good fit therewith, it is difficult, due to the large frictional engagement, to move a pipe section, after it has been initially tacked or welded, into a successive position. Furthermore, in a machine of the present type, where a plurality of sections are joined together to be handled in unison as a pipe length, the weights involved are considerable and the power required for handling becomes large.

In order to assist in the handling of the pipe sections, I provide means for reducing the frictional resistance and for facilitating movement of the pipe sections. For this reason, at appropriate locations on the frame 12, preferably under the bed 13, I provide a plurality of retractable supporting rollers 61, each of which is mounted in a yoke 62 at the end of a piston rod 63. A piston 64, within a hydraulic cylinder 66, is ordinarily urged downwardly by a heavy coil spring 67, but is urged upwardly against the spring by hydraulic fluid entering through a pipe 68. The cylinder 66 is supported on an I-beam 69 which rests upon the framework 12.

When hydraulic fluid is admitted through the pipe 68 the piston 64 is lifted and the roller 61 is moved upwardly through an aperture 71 in the cradle 14, so that when the arms 17 and 18 are released, the roller 61 is effective to lift the pipe section slightly above the cradle or sufficiently so that the pipe section is out of frictional engagement therewith and can then readily be moved axially of the cradle upon the anti-friction rollers 61. While I have found in practice that in a machine of the size described about three of the rollers 61 are sufficient, they can be provided in any number desired, depending upon the general capacity of the machine and the weight of the material being handled.

I preferably arrange it so that the rollers 61 are automatically projected through the apertures 71 to lift the pipe sections and are automatically retracted therefrom to permit the sections to conform to the cradle in appropriate sequence with the operation of the machine. For this reason the pipes 68 all connect to a manifold pipe 72 which joins a valve 73 having two positions, in order to connect the manifold 72 selectively with a pressure fluid inlet pipe 74 or, alternatively, a pressure fluid outlet pipe 76. The valve 73 is preferably operated by a linkage 77 which is connected with the lever 49, so that, as the hoses 24 and 26 are expanded, for example, the valve 73 is actuated to release the pressure from the pistons 64 and permit retraction of the rollers 61, and so that, alternatively, when the hoses 24 and 26 are collapsed the piston 64 is subject to hydraulic pressure in order to project the rollers 61 to operating position.

Despite the accuracy with which the cradle 14 and the arms 17 and 18 hold the pipe sections to be welded, it is sometimes advisable to provide an additional means at the adjacent circular edges of successive sections in order to hold the corners of the plate accurately in position while the tack-welding is being effected. For this purpose I preferably provide a plurality of superstructures 81 on the frame 12, preferably at locations adjacent the meeting edges of successive pipe sections 6, 7, 8, 9 and 10, for example. These superstructures are all identical and each one supports a hydraulic cylinder 82 within which is a piston 83, ordinarily held in upper position by a heavy spring 84. On the piston is a piston rod 86 carrying an arcuate, circular-cylindrical shoe 87 of sufficient axial extent to overlap and to press against the adjacent ends of successive sections simultaneously. When the spring 84 is effective, the shoe 87 is lifted and is out of contact with the pipe sections, but when the piston 83 is depressed, the shoe 87 is likewise pressed onto the pipe sections to force them toward the cradle 14 and to bring all of the adjacent pipe section surfaces into correct cylindrical location for the welding operation.

In order to actuate the pistons 83, each of the cylinders is connected by a pipe 88 with a manifold 89 extending through a manually operable valve 91 to the connection 38. If the shoes 87 are not needed, the valve 91 is closed, thereby rendering the cylinders 82 all inoperative. On the other hand, if the valve 91 is opened, the cylinders 82 all receive hydraulic pressure fluid simultaneously with the hoses 24 and 26, so that the shoes 87 descend into clamping relationship at the same time as the arms 17 and 18. Correspondingly, when the lever 49 is moved to release the hydraulic pressure from the hoses 24 and 26, pressure is simultaneously released from the shoes 87 and they are retracted by their associated springs. If desired, the valve 91 can be closed when the shoes 87 are depressed and then, despite release of pressure by manipulation of the lever 49 and release of the arms 17 and 18 from the pipe sections, the shoes 87 will still remain in place until such time as the valve 91 is subsequently opened.

While in a large establishment various pipe-forming machines can be provided, one for each size of pipe to be fabricated, in many other establishments and under other conditions it is advisable to provide means for adapting a single machine to the forming of pipe of different diameters.

For this reason, therefore, I provide, as shown in Fig. 8, a removable cradle 101 which preferably is a semi-circular cylindrical sheet 102 corresponding closely with the contour of the smaller-diameter pipe to be fabricated and supportable within the large cradle 14 by a plurality of radial fins 103 which rest against the cradle 14 when the cradle 101 is installed therein. This relationship is illustrated in Fig. 7. To complement the cradle 101 I preferably affix to the arms 17 and 18 a plurality of arcuate shoes 104, each of which on its inner curve 106 is of substantially the curvature of the plate 102. Each shoe is fastened to its associated arm by bolts 107 which pass through perforations 108 in the shoe and corresponding apertures in the arms. The shoes, therefore, can readily be installed or removed, simply by manipulating the bolts 107. With the addition of the cradle 101 and the shoes 104 it is possible accurately to form a smaller-section pipe, and, if desired, the pistons 64 and 83 can be afforded a sufficient stroke to operate through suitable apertures in the plate 102 and between the shoes 104 in order to handle the smaller-sized pipes in the same way as the larger one was handled.

I claim:

1. A pipe-forming machine comprising a frame, an elongated substantially semi-circular cradle removably supported on said frame for receiving a plurality of successive pipe sections and conforming to a part of the contour of the pipe to be formed, a plurality of opposed arms on said frame and movable away from and toward an approached position in which the arms conform to the remaining part of the contour of the pipe to be formed, the said arms being operable to clamp said pipe sections in said cradle, and means for facilitating axial sliding of the formed pipe relative to the elongated cradle including means for lifting the pipe slightly so that the pipe is out of frictional engagement with the bottom of said cradle but in guiding contact with the side wall of said cradle, and an anti-friction terminus on said lifting means.

2. A pipe-forming machine comprising a frame, an elongated substantially semi-circular cradle removably supported on said frame for receiving a plurality of successive pipe sections and conforming to a part of the contour of the pipe to be formed, a plurality of opposed arms on said frame and movable away from and toward an approached position in which the arms conform to the remaining part of the contour of the pipe to be formed, the said arms being operable to clamp said pipe sections in said cradle, means for facilitating axial sliding of the formed pipe relative to the elongated cradle including means for lifting the pipe slightly so that the pipe is out of frictional engagement with the bottom of said cradle but in guiding contact with the side wall of the cradle and an anti-friction terminus on said lifting means, and means for alternately operating said clamping arms and said lifting means.

3. A pipe-forming machine comprising a frame, an elongated cradle on said frame for supporting successive pipe sections, a hydraulically operated shoe engageable simultaneously with adjacent edges of adjacent sections, a plurality of movable clamping arms disposed on opposite sides of said cradle for clamping said pipe sections in said cradle, an elongated deformable member operatively connected to the clamping arms on each side of said cradle, and means for supplying hydraulic fluid simultaneously to opposite ends of said elongated member to inflate the same whereby to actuate said arms substantially simultaneously.

4. A pipe-forming machine comprising a frame, an elongated substantially semi-circular cradle removably supported on said frame for receiving a plurality of successive pipe sections and conforming to a part of the contour of the pipe to be formed, a hydraulically operated shoe engageable simultaneously with adjacent edges of adjacent pipe sections, a plurality of pairs of opposed hydraulically operated arms disposed on opposite sides of said shoe in the length of said cradle movable away from and toward an approached position in which the arms conform to the remaining part of the contour of the pipe to be formed, the said arms being operable to clamp said pipe sections in said cradle, adjustable means for limiting the clamping movement of said arms, an elongated deformable member operatively connected to a clamping arm of each of said pairs, means for supplying hydraulic fluid simultaneously to opposite ends of said elongated member to inflate the same whereby to actuate the clamping arms substantially simultaneously, and a single control means for hydraulically operating said shoe to engage said pipe sections and said arms for clamping said pipe sections.

5. A pipe-forming machine comprising a frame, an elongated cradle on said frame for supporting successive pipe sections, a hydraulically operated shoe engageable simultaneously with adjacent edges of adjacent sections, a plurality of movable clamping arms disposed on opposite sides of said cradle for clamping said pipe sections in said cradle, adjustable means for limiting the clamping movement of said clamping arms, an elongated deformable member operatively connected to the clamping arms on each side of said cradle, and means for supplying hydraulic fluid simultaneously to opposite ends of said elongated member to inflate the same whereby to actuate said arms substantially simultaneously.

6. A pipe-forming machine comprising a frame, an elongated cradle on said frame for receiving a plurality of successive pipe sections and conforming to a part of the contour of the pipe to be formed, a hydraulically operated shoe engageable simultaneously with adjacent edges of adjacent pipe sections, a plurality of hydraulically operated clamping arms disposed on opposite sides of said shoe in the length of said cradle for clamping said pipe sections in said cradle, said arms when in clamping position conforming to the remaining part of the contour of the pipe to be formed, an elongated conduit for carrying fluid to actuate said clamping arms and receiving hydraulic fluid simultaneously at opposite end portions thereof whereby to actuate said arms substantially simultaneously, a single control means for hydraulically operating said shoe to engage said pipe sections and said arms for clamping said pipe sections, and means for facilitating axial sliding of the formed pipe relative to the elongated cradle including means for lifting the pipe slightly so that the pipe is out of frictional engagement with the bottom of said cradle but in guiding contact with the side wall of said cradle.

FREDERICK W. HAVERSACK.